United States Patent
Barker et al.

(10) Patent No.: US 7,054,420 B2
(45) Date of Patent: May 30, 2006

(54) VOICE OVER IP TELEPHONE RECORDING ARCHITECTURE

(75) Inventors: Kirk Barker, Scurry, TX (US); Darrell D. Roberts, Flower Mound, TX (US)

(73) Assignee: TelStrat International, Ltd., Plano, TX (US)

( * ) Notice: Subject to any disclaimer, the term of this patent is extended or adjusted under 35 U.S.C. 154(b) by 56 days.

(21) Appl. No.: 10/065,028

(22) Filed: Sep. 11, 2002

(65) Prior Publication Data

US 2004/0047451 A1 Mar. 11, 2004

(51) Int. Cl.
*H04M 1/64* (2006.01)
(52) U.S. Cl. .................... 379/88.25; 379/88.17
(58) Field of Classification Search .. 379/88.22–88.28, 379/85, 123, 140; 709/223–224
See application file for complete search history.

(56) References Cited

U.S. PATENT DOCUMENTS

| | | | | |
|---|---|---|---|---|
| 5,533,103 A | * | 7/1996 | Peavey et al. ................. | 379/69 |
| 5,535,261 A | * | 7/1996 | Brown et al. ............. | 379/88.11 |
| 5,819,005 A | * | 10/1998 | Daly et al. .................. | 704/200 |
| 6,029,063 A | * | 2/2000 | Parvulescu et al. ....... | 455/412.1 |
| 6,122,665 A | * | 9/2000 | Bar et al. ................... | 709/224 |
| 6,222,909 B1 | * | 4/2001 | Qua et al. ................ | 379/88.22 |
| 6,233,320 B1 | * | 5/2001 | Haimi-Cohen ........... | 379/88.27 |
| 6,445,694 B1 | * | 9/2002 | Swartz ....................... | 370/352 |
| 6,661,879 B1 | * | 12/2003 | Schwartz et al. ........ | 379/88.25 |
| 6,668,044 B1 | * | 12/2003 | Schwartz et al. ............. | 379/68 |
| 6,778,639 B1 | * | 8/2004 | Gusler et al. ................. | 379/68 |
| 2001/0051037 A1 | * | 12/2001 | Safadi et al. .................. | 386/83 |
| 2003/0223552 A1 | * | 12/2003 | Schoeman ............... | 379/88.13 |

* cited by examiner

*Primary Examiner*—Fan Tsang
*Assistant Examiner*—Joseph T Phan
(74) *Attorney, Agent, or Firm*—Schwegman, Lundberg, Woessner & Kluth, P.A.

(57) ABSTRACT

A method and system is disclosed for on-demand recording of a voice session by a telephone recording device in a telecommunication network. After establishing a voice session between the telephone recording device and at least one communication device, a user of the telephone recording device may instruct it to store voice data during the voice session so long as the voice session has not been terminated. During the voice session, the telephone recording device processes and transmits the voice data to and saved at a storage server without going through a centrally located exchange device, wherein the saved voice data is available for on-demand replay.

21 Claims, 5 Drawing Sheets

VOICE OVER IP TELEPHONE RECORDING ARCHITECTURE

BACKGROUND OF INVENTION

The present invention relates to a distributed network architecture for recording a stream of analog or digital data.

In the current state of the industry, in order to record the contents of a telephone call, computer transmission, television program, or any form or type of analog or digital data transmission, there are two basic methods. The first method is "logging," which consists of recording every transmission, from initiation until termination, regardless of the content or characteristics of the transmission. Because logging is independent of the contents and characteristics of the transmission, if a specific transmission is to be reviewed, it becomes necessary to record every transmission. Recording every transmission, however, requires a significant amount of storage space. Further, because of the number of transmissions recorded, it is difficult and time-consuming to locate a specific transmission.

The second method of recording a transmission is "event driven" recording, which records a transmission upon the occurrence of a certain condition or event. In some instances, the recording condition may be the start of the transmission (which is, in effect, the logging method), while in other instances the event will occur during the transmission (such as when a user presses a "record" button during the transmission). Other events may be time-based, such as when recording begins and ends at a specific times. One difficulty of an event driven recording system is properly defining the event that initiates recording. An overly broad event may record too many transmissions, while too specific of an event may not record enough. Another disadvantage of event driven recording is that the event may not occur, or may occur at the wrong time, resulting in not all of the content of the transmission being recorded. Yet another disadvantage is that if the event cannot (or does not) occur until after the initiation of transmission, then the transmission that occurs prior to the event is not recorded. Further, for communications via computer instant messenging, a similar disadvantage occurs when the content of the conversation may "scroll off" the screen before the user can save the earlier portions of the conversation.

The above described recording methods all deal with a centralized network architecture. That is, the functional components that manage call control and voice transmission are all centrally located in a Private Branch Exchange (PBX) of a private network. More specifically, a recording initiation device such as a recording phone has to obtain all call control information and voice data for other phones in connection therewith from the PBX.

What is needed is distributed network architecture for recording voice data between telephones.

SUMMARY OF INVENTION

A method and system is disclosed for on-demand recording of a voice session by a telephone recording device in a telecommunication network. After establishing a voice session between the telephone recording device and at least one communication device, a user of the telephone recording device may instruct it to store voice data during the voice session so long as the voice session has not been terminated. During the voice session, the telephone recording device processes and transmits the voice data to and saved at a storage server without going through a centrally located exchange device, wherein the saved voice data is available for on-demand replay.

DETAILED DESCRIPTION

The following disclosure provides many different embodiments, or examples, for implementing different features of an on-demand recording system. Specific examples of components, processes, and implementations are described to help clarify the invention. These are, of course, merely examples and are not intended to limit the invention from that described in the claims.

Figure 1:
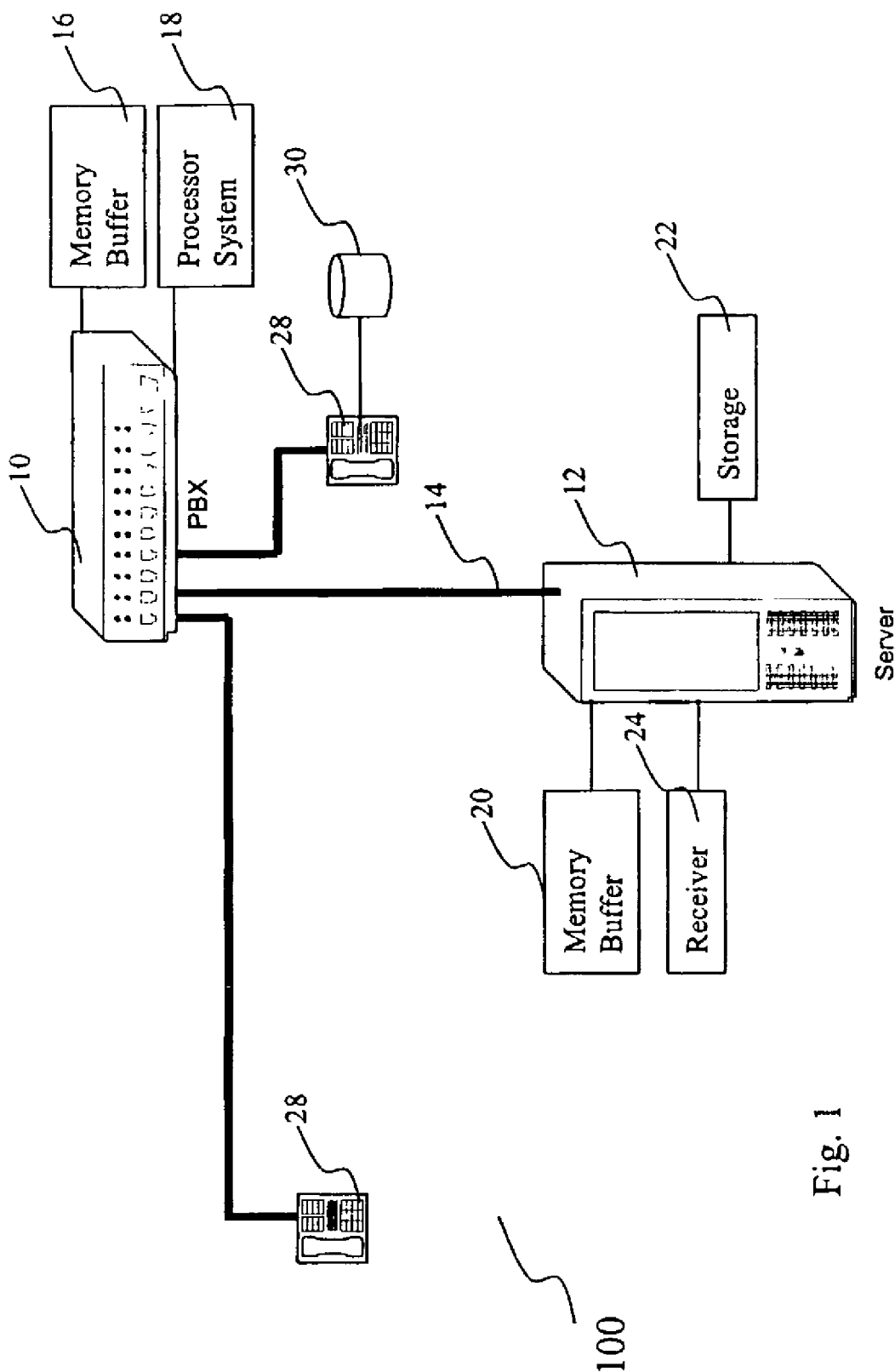
FIG. 1 illustrates a conventional telephone recording system using a centrally located exchange device.

Referring to FIG. 1, a centralized on-demand recording system 100 includes an centrally located exchange device 10 connected to a server 12 via a network 14. The centrally located exchange device 10 such as a PBX includes a memory buffer 16, such as RAM or a hard drive, a processor 18 for converting analog signals into digital signals, and for placing data into packets. While only one processor 18 is shown, it is contemplated that a processing system, composed of one or more processors in conjunction with firmware or software, could provide equivalent functionality. The server 12 includes a memory buffer 20, such as random access memory (RAM) or a hard drive, a storage device 22, such as a compact disk (CD-ROM) drive, floppy drive, or hard drive, and a device 24 for receiving a save initiation request. The centrally located exchange device 10 is connected to one or more communication devices 28 via the network 14. Communication devices 28 may be capable of transmitting or receiving analog or digital signals via the network 14. The network may be any type of wired or wireless system for transmission of signals, including, a plain old telephone switch (POTS) network, computer packet network, or television broadcast system.

Connected to at least one of the communication devices 28 is a save initiator 30, which allows a user to initiate a save request. While depicted in FIG. 1 as being connected to one of the communication devices 28, the save initiator 30 may instead (or in addition) be connected to any of the other components or may be a stand-alone component connected to the network, thus allowing the initiation of the save request by someone other than a user of the communication devices 28.

While two parties are engaging in a voice session, the corresponding voice data is duplicated and digitized by the processor 18 and may be placed into packets. The packets are then provided over the network and received by the server 12. The server 20 extracts (e.g., de-packetizes) the digitized information from the packets and stores the extracted information in the memory buffer 20. If a save request signal is initiated, the save initiator 30 transmits a save request signal for receipt by the receiver 28. When the connection is terminated, the contents of the memory buffer 20 on the server 20 is copied onto the storage device 22. The saved information of the entire connection on storage device 22 is made available for playback via devices such as the communication device 28.

In an enterprise environment wherein a complex telephone system is deployed, any number of telephones 28 may be connected to any number of line cards of the centrally located exchange device 10. The line cards may contain functional modules that deliver that functions equivalent to the memory module 16, digitizing processor and packetizing processor system 18.

Figure 2:
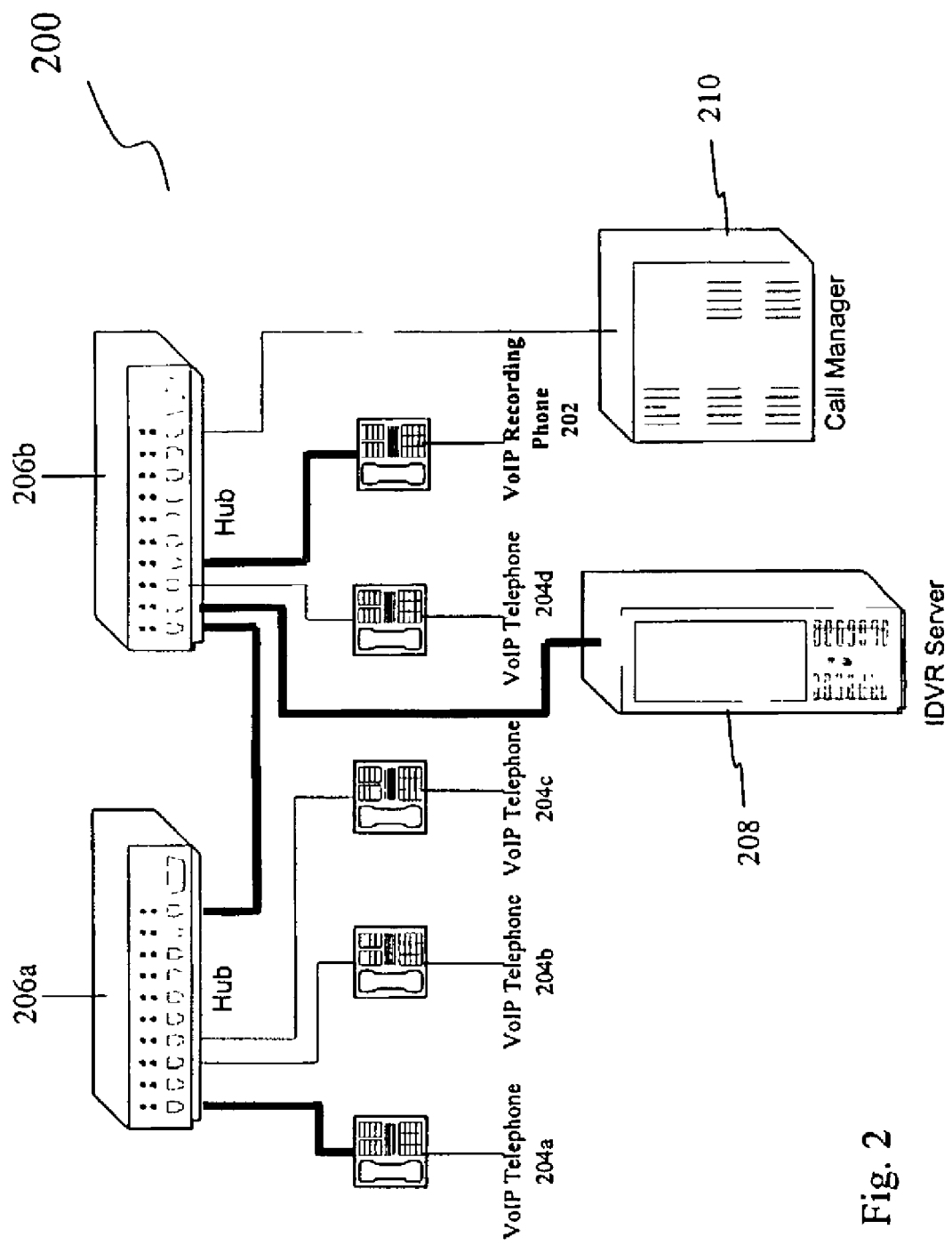
FIG. 2 illustrates a distributed recording system in a telecommunication network using a recording phone.

FIG. 2 is a graphic representation for a distributed Voice Over IP (VoIP) telephone network 200 including a telephone recording device such as a VoIP recording phone 202 and other communication devices such as regular VoIP telephones 204a–d, which may not have the recording feature. Although only one VoIP recording phone 202 is shown, it is understood that a number of such phones can be connected to the network 200. It is assumed that telephones 204 a–c are connected to a hub device 206a, and telephone 204d and the recording telephone 202 are connected to another hub device 206b. The hub device 206a or 206b can be an Ethernet hub device that are normally used to connect various computing devices such as another hub device, a storage server such as an IDVR server 208, or a call control unit such as a call manager 210. The VoIP recording telephone 202 performs an on-demand recording process to process and send all voice data from any other telephone involved in a conversation therewith to the IDVR server for recording purposes without going through a centrally located exchange device (such as the server 12 of FIG. 1). The recording telephone 202 also obtains call control information from the call manager 210 without involving a centrally located exchange device.

When a voice session is established between two telephones transmitting voice data, while at least one of which is a VoIP recording telephone 202 and the other is a regular phone such as telephone 204a, the voice data initiated by telephone 204a goes to a local switch device such as the hub 206a, further through another hub 206b, and reaches the recording phone 202. The recording phone 202 will dynamically process and duplicate the voice data received. If the voice data is not already in digital form, it is digitized and packetized by the recording phone 202, and sent to the IDVR server 208. The IDVR server 208 will extract (e.g., de-packetize) the digitized voice data from the packets and store the data in a memory buffering device such as a memory module in the IDVR server. If needed, the voice data is further stored in a persistent memory device for future replay.

Figure 3:
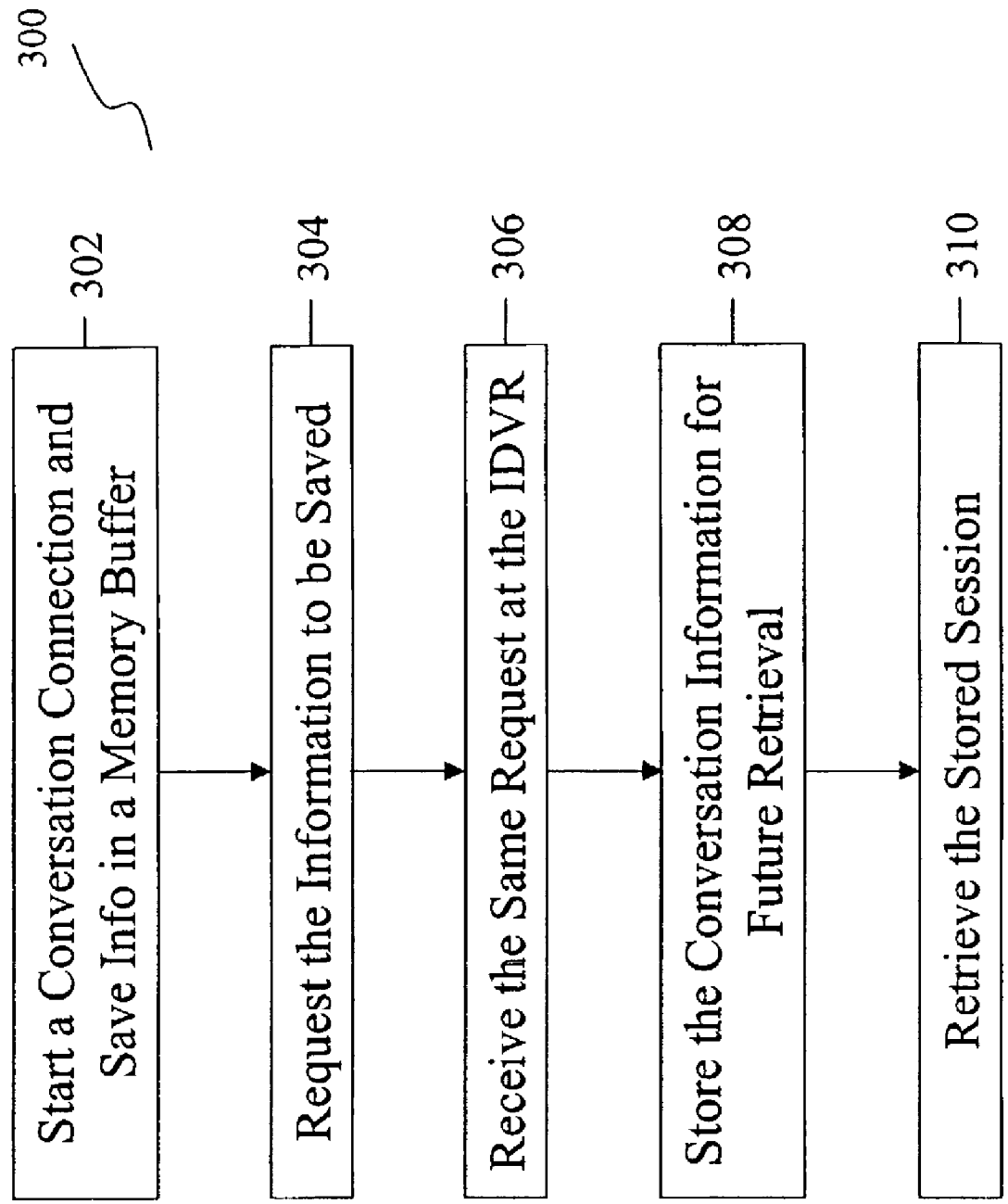
FIG. 3 illustrates a flow diagram for implementing the on-demand recording of a voice session according to one embodiment of the present invention.

FIG. 3 illustrates a flow diagram 300 for recording a voice session over a VoIP recording network 200. After a voice session is established in step 302, the voice data (either initiated by the recording phone or other noon-recording phone) is packetized by the VoIP recording phone 202 and sent to the IDVR server for temporary storage. A temporary memory buffering device such as a memory buffer of the IDVR server may be used to tentatively hold the stored information. At any time during the voice session and up until the session is terminated, the user of the recording phone 202 may request that the information of the entire voice session be saved for later retrieval by initiating a save request in step 304. To initiate the save request, the user may only need to push a predetermined button on the recording phone 202. Other user interfaces may also be possible to send the save request. Although the VoIP recording phone is the instrument processes the save request, it is noted that it doesn't have to be the user of the VoIP recording phone who initiates the request, a user on the other end of the line using a regular VoIP telephone can also initiate the process by sending a notice to the VoIP recording phone. Since the packets are used as the transport means for information exchange, it should be understood by one skilled in the art that all other VoIP telephones can send a signal to the VoIP recording phone to request a conversation session to be saved. It should be noted, however, that the user of the VoIP telephone recording system does not necessarily have to be a user of a telephone 204a–d or 202. The user can use a computer terminal that can communicate with the VoIP recording phone. In step 306, the save request signal is sent to and received by the IDVR server. Upon receiving the instruction, the IDVR server stores all the voice data currently stored in the temporary memory module and any forthcoming voice data in a predetermined persistent storage device of the IDVR server for future retrieval (step 308). On the other hand, if the save request is never initiated before the end of the voice session, the voice data tentatively stored by the IDVR server will be deleted when the voice session ends. The user can retrieve the stored voice data at any time from the IDVR server through any compatible playback device such as a regular VoIP telephone (step 310). In this manner, regardless of when the save request is initiated during the session, the entire communication of the voice session is available for playback. It is also understood that the temporary memory buffering device does not need to be on the IDVR server, it can reside in the VoIP phone as well. If so, the VoIP recording phone processes the voice data and keeps it until it is clear whether the voice data needs to be sent to the IDVR server for storage. In other words, if the voice session ends without a save request ever issued, the VoIP phone discards the content tentatively saved thereon. The hubs shown can be replaced by switches if required, and the voice session can still be recorded based on the above described principles. FIG. 3 thus illustrates a distributed communication architecture (e.g., most likely within a company) wherein two or more people can start and record a peer-to-peer conversation without involving a centrally located exchange device such as a private branch exchange (PBX) or any similar devices.

Figure 4:
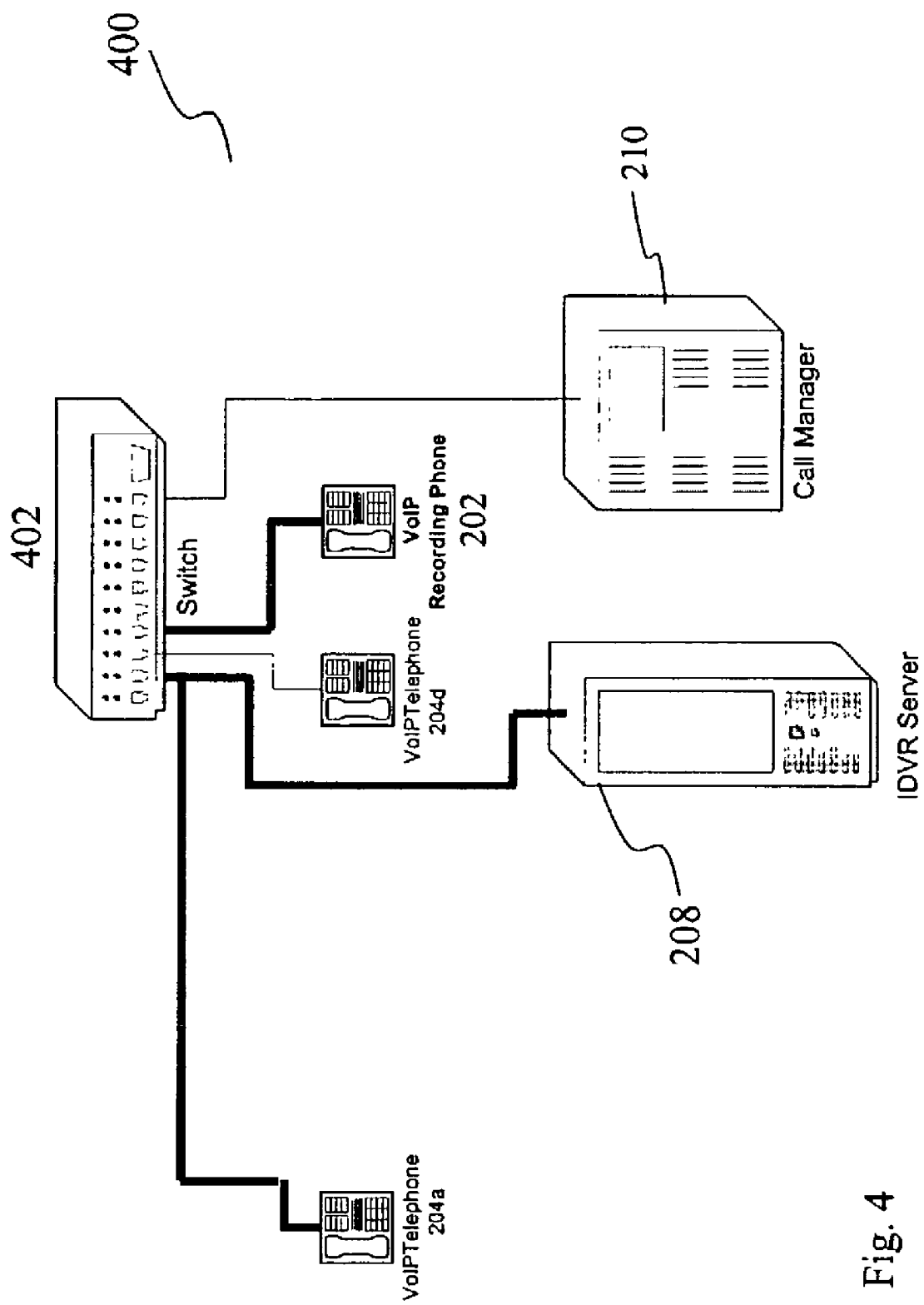
FIG. 4 illustrates a distributed recording system in a telecommunication network using a recording phone according to another embodiment of the present invention.

FIG. 4 illustrates a peer-to-peer VoIP telephone recording system 400 involving only one local switch device. The system 400 is similar to the system 200 of FIG. 2 except that only one switch 402 is involved. The switches, like the hubs, operate at the Ethernet level for the communication, and only serve the purpose of routing the packets from one end to the other of an established communication link. In this configuration, a voice session is carried out with voice data transmitted only through one single switch. No centrally located exchange device is involved at all.

Figure 5:
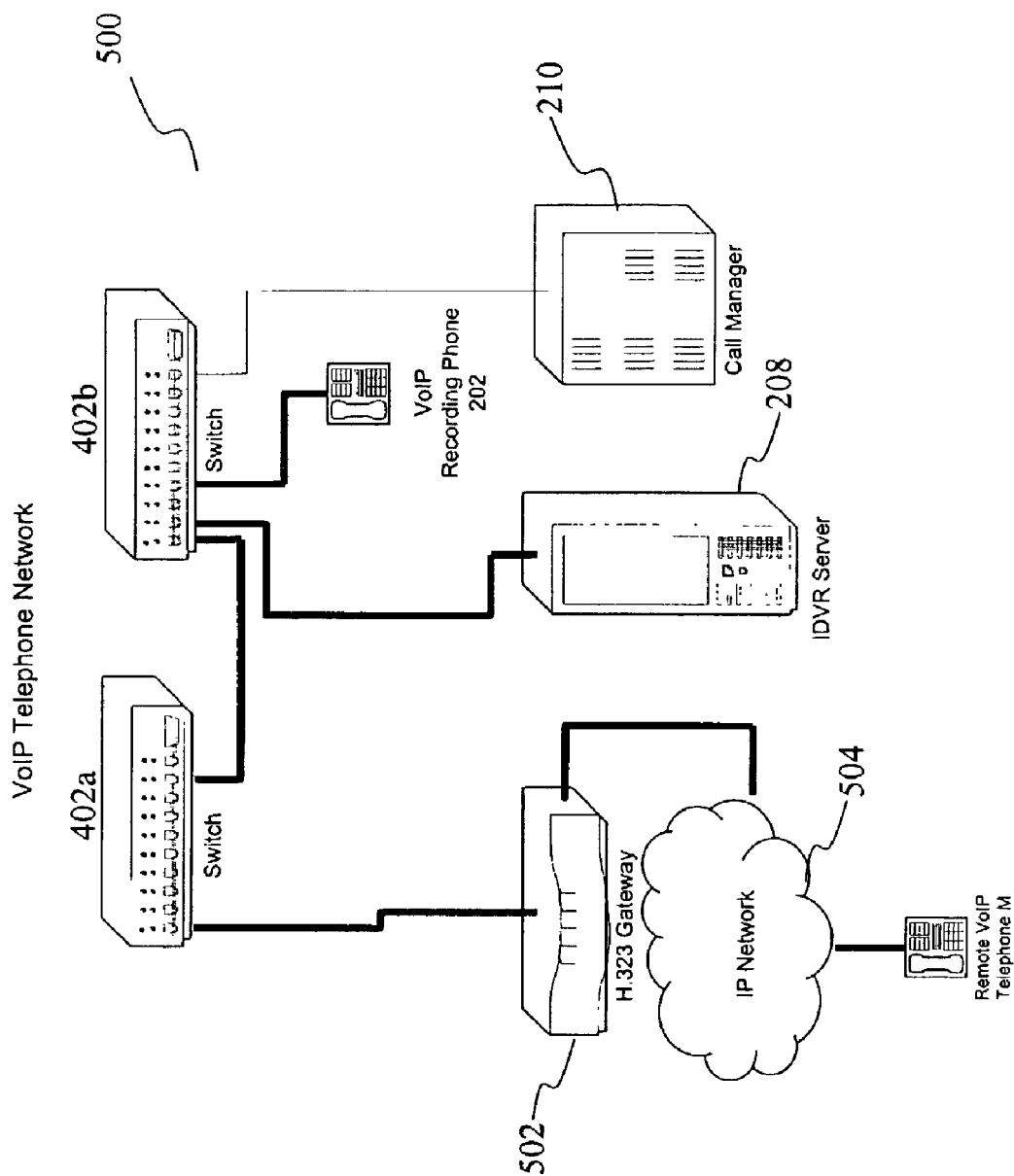
FIG. 5 illustrates a distributed recording system in a telecommunication network using a recording phone according to another embodiment of the present invention.

FIG. 5 illustrates a VoIP telephone recording system 500 according to another embodiment of the present invention. This system 500 connects a VoIP recording phone with a remote VoIP phone through a series of network devices such as the switches 402a–b, a gateway device 502, and an IP transport network 504. This illustrates that the voice recording mechanism as described with FIG. 3 can be extended to a much bigger network or even to multiple networks as long as one VoIP recording phone is operating together with an IDVR server 208 and a call manager 210, which manages the voice session. It is also understood that since the VoIP recording phone transmits packets to the IDVR server 208, the IDVR server does not have to be physically located in the same network or in the vicinity of the recording phone. As the packets can travel a long distance in a short time period, the IDVR server can actually be located in a different network.

The VoIP recording phone 202 shown in FIGS. 2–5 can be easily replaced by computing devices such as personal computers or personal digital assistants as long as such computer device has the VoIP recording telephone function. While packets are used in the preferred embodiment above, other forms of data transfer are commonly used by those skilled in the art, including, for example, frames, raw data, or tokens.

The present invention as described above thus provides an improved method for allowing the entire telephone conversation, and other streams of analog or digital data to be recorded when the triggering event to record the data is initiated during the transmission. It is also contemplated by the present invention that various components of the invention could be combined to reduce the number of components.

While the invention has been particularly shown and described with reference to the preferred embodiments thereof, it will be understood by those skilled in the art that various changes in form and detail may be made therein without departing from the spirit and scope of the invention, as set forth in the following claims.

The invention claimed is:

1. A method for on-demand recording of a voice session by a telephone recording device in a telecommunication network, the method comprising:
    establishing a voice session between the telephone recording device and at least one communication device;
    automatically temporarily storing voice data representing the voice session in a memory buffer device in a storage server, wherein the temporary storing is automatically initiated upon the establishment of the voice session;
    instructing the telephone recording device to store the voice data, wherein the instruction can occur at any time during the voice session so long as the voice session has not been terminated, and wherein the instruction to store the voice data is initiated by a user of the telephone recording device during the voice session; and
    processing the voice data by the telephone recording device to be transmitted to and saved at a storage server, wherein the saved voice data is available for on-demand replay.

2. The method of claim 1 further comprising duplicating the voice data at the telephone recording device and storing in a memory buffer device contained therein.

3. The method of claim 1 further comprising:
    persistently storing the temporarily stored voice data in the storage server only after the instruction for recording is received.

4. The method of claim 1 wherein the processing further comprises digitizing the voice data.

5. The method of claim 1 wherein the voice session is carried out through two local switch devices directly connected therewith, a first local switch device servicing the telephone recording device and a second local switch device servicing the communication device.

6. The method of claim 5 wherein the first local switch device is connected to the storage server.

7. The method of claim 5 wherein the first local switch device is connected to a call manager server for managing the voice session.

8. A system for on-demand recording of voice data, comprising:
    at least one local switch device for establishing a voice session between a communication device and a telephone recording device;
    a memory buffer for temporarily storing voice data representing the voice session;
    a storage server connected to the local switch device for saving the voice data sent by the telephone recording device;
    a save initiator for dynamically initiating the voice data recording during the voice session, wherein the recording can be started by a user at any time during the voice session, and wherein the recording saves the entire voice session by copying the voice data from the memory buffer to the storage server,
    wherein the telephone recording device processes and transmits the voice data to the storage server through the local switch device.

9. The system of claim 8 wherein the telephone recording device processes and transmits the voice data to the storage server through the local switch device without involving a private branch exchange (PBX).

10. The system of claim 8 wherein the local switch device is a hub device.

11. The system of claim 8 wherein the local switch device is a local switch.

12. The system of claim 8 wherein the telephone recording device includes a processor for digitizing the voice data.

13. The system of claim 8 wherein the save initiator is on the telephone recording device.

14. A telephone recording device used in an on-demand voice data recording system, comprising:
    means for establishing a voice session with a communication device through communications with at least one local switch device;
    a save initiator on the telephone recording device for dynamically initiating the voice data recording at any time during the voice session, wherein the voice data represents the voice session from the beginning of the voice session;
    a processing means for digitizing the voice data into a digital form;
    a storage buffering means for automatically saving the digitized voice data; and
    a transmission module for sending the digitized voice data from the storage buffering means to a storage server connected to the local switch device in response to a signal from the save initiator.

15. A system for on-demand recording of voice data, the system comprising:
    a telephone recording device connected to a first local switch device;
    at least one communication device connected to a second local switch device for establishing a voice session with the telephone recording device through a communication link between the first and second local switch device;
    a save initiator for dynamically initiating the voice data recording during the voice session in real time in response to user input received at any time during the voice session, wherein the recorded voice data represents the voice session from the beginning of the voice session; and
    a storage server connected to the first local switch device for saving the voice data sent by the telephone recording device;

wherein the telephone recording device processes and transmits the voice data to the storage server through the first local switch device.

16. A system for peer-to-peer on-demand recording of voice data, the system comprising:
    a telephone recording device and at least one communication device connected to a local switch device, the telephone recording device having:
    a save initiator for dynamically initiating the voice data recording after a voice session is established between the telephone recording device and the communication device, wherein the voice data is a representation of the entire voice session, and wherein the save initiator is configured to initiate the recording in response to user input received at any time until the voice session is terminated;
    a processing means for packetizing the voice data;
    a memory buffer for temporarily storing the voice data; and
    a storage server connected to the local switch device for storing the temporarily saved voice data sent by the telephone recording device.

17. The system of claim 16 further comprising a replay means on the telephone recording system for playing back the stored voice data.

18. The system of claim 16 wherein the memory buffer is on the telephone recoding device.

19. The system of claim 16 wherein the memory buffer is on the storage server.

20. A method for storing a peer-to-peer telephone conversation session between a coordinating user using a telephone recording device and at least one regular user using at least one communication device which does not have a recording feature, the method comprising:
    establishing the peer-to-peer telephone conversation session between the telephone recording device and the communication device through a local switch device;
    temporarily saving voice data representing the entire session in a memory buffer of the telephone recording device; and
    instructing, by the user, during the session and before the session ends, the telephone recording device to store the temporarily saved voice data in a storage server connected to the local switch device.

21. The method of claim 20 further comprising replaying the stored voice data.

* * * * *